United States Patent [19]

Podkopaev et al.

[11] 4,144,656

[45] Mar. 20, 1979

[54] TEACHING MACHINE FOR STUDYING FOREIGN AND NATIVE LANGUAGES

[75] Inventors: Boris I. Podkopaev, Moscow; Ivan F. Klunko, Lubny Poltavskoi oblasti; Grigory S. Kiry, Lubny Poltavskoi oblasti; Vyacheslav V. Ocheretko, Lubny Poltavskoi oblasti; Lev I. Rozhdestvensky, Ufa; Ljudmila D. Chervyakova, Moscow, all of U.S.S.R.

[73] Assignee: Moskovsky Gosudarstvenny Pedagogichesky Institut Inostrannykh Yazykov Imeni M. Toreza, Moscow, U.S.S.R.

[21] Appl. No.: 850,681

[22] Filed: Nov. 11, 1977

[30] Foreign Application Priority Data

Nov. 12, 1976 [SU] U.S.S.R. .............................. 2419519

[51] Int. Cl.² ............................................. G09B 7/04
[52] U.S. Cl. ...................................... 35/9 A; 35/35 R
[58] Field of Search .............. 35/9 R, 9 A, 9 B, 35 R, 35/35 C

[56] References Cited

U.S. PATENT DOCUMENTS

| 3,780,450 | 12/1973 | Podkopaev et al. | 35/9 A |
| 3,983,639 | 10/1976 | Podkopaev et al. | 35/9 A |

Primary Examiner—William H. Grieb
Attorney, Agent, or Firm—Lackenbach, Lilling & Siegel

[57] ABSTRACT

A teaching machine for studying foreign and native languages comprises a task unit for a program of successive algorithmic exercises having unambiguous solutions, a machine control unit, an answer input unit, an answer analysing unit, a signalling unit, a reference unit and a decoder. The task setting unit is provided with a detachable programmer made as a memory interacting with a memory unit of the task unit and the answer input unit and thus ensuring programming of any algorithmic exercise from any conventional textbook. The proposed invention permits wider didactic machine capabilities and more economic operation.

5 Claims, 3 Drawing Figures

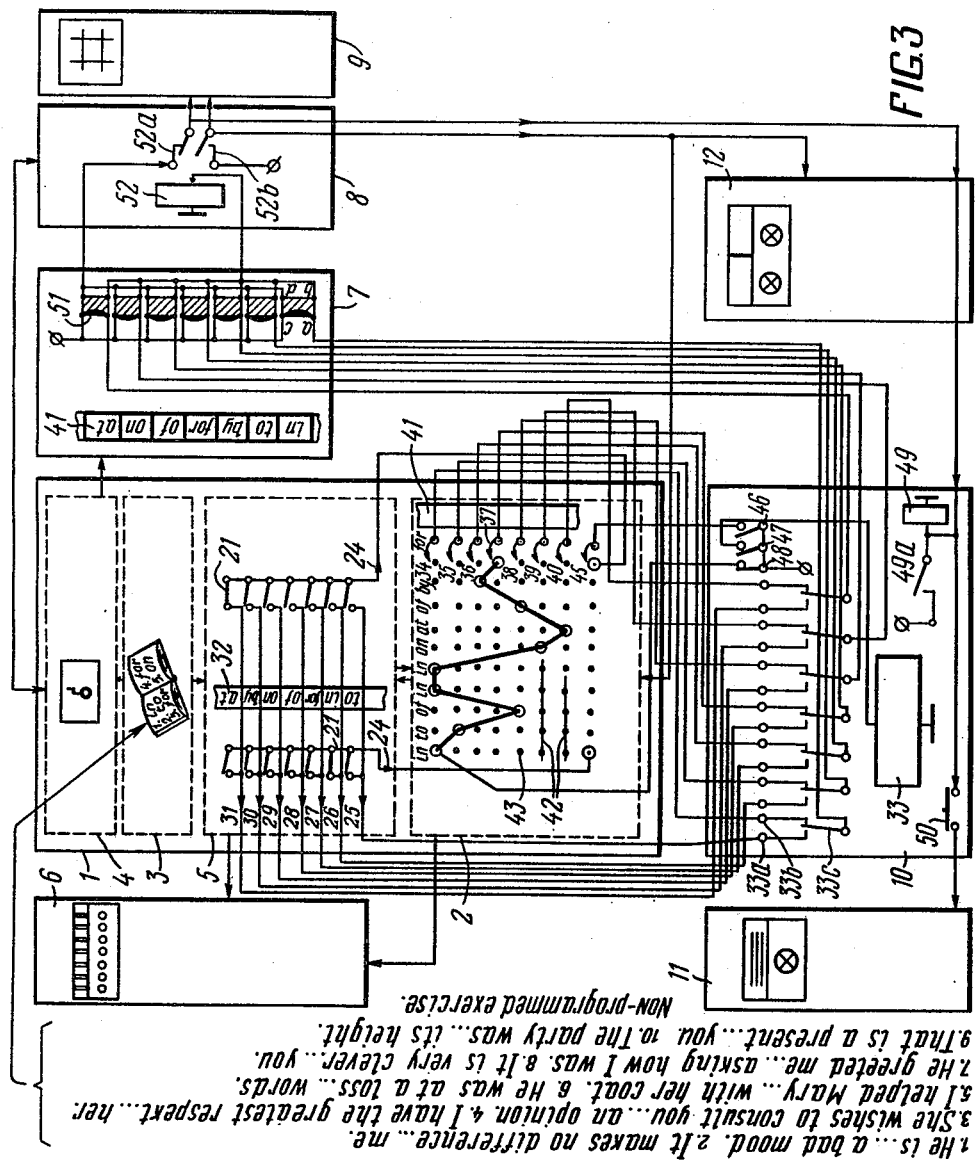

TEACHING MACHINE FOR STUDYING FOREIGN AND NATIVE LANGUAGES

FIELD OF THE INVENTION

The invention relates to teaching machines intended preferably for teaching foreign and native languages.

DESCRIPTION OF THE PRIOR ART

A teaching machine (cf., U.S. Pat. No. 3,780,450 issued Dec. 25, 1973, G09B) 7/04 is known which comprises a task unit to exhibit a program of successive algorithmic exercises, including a program carrier, a memory for storing the inner codes of answers to the questions of the program and a remote control panel to ensure the semiautomatic mode of operation of the teaching machine. The teaching machine also comprises a decoder intended for decoding the inner programs of the memory and indicating the correct answer. The decoder is connected to the memory of the task unit to which an answer input unit is connected, which is coupled to one input of an answer analysing unit whose other input is coupled to the remote control panel of the task unit. The outputs of the answer analysing unit are coupled to a printout mechanism, to the memory and to a signalling unit. The signalling unit indicates what answer was put in by the student, a correct one or an incorrect one, as well as the mode of operation of the teaching machine. The signalling unit is connected to the control unit which insures, when a correct answer is given to the question of the exercise, transition to the next exercise. The inputs of the control unit are connected to the answer analyzing unit and to the memory. The outputs of the control unit are connected to the answer input unit and a reference unit which is intended to insure, when an incorrect answer is given, delivery of reference material to each item of the program of algorithmic exercises.

Teaching programs for the known teaching machine are always coded, taking into account the internal permanent memory of the machine. Frequently in the process of teaching this presents certain difficulties, since the known machine cannot be used to train exercises from conventional text books. The memory does not offer such a possibility, irrespective of its large volume, since exercises from conventional textbooks have to be programmed taking into account the internal code of the machine memory. This, as a rule, is not possible. Exercises from conventional textbooks have to be reprogrammed, they also have to be retyped and duplicated, that means, actually, composition of a new exercise and not direct programming of this exercise for the use by the machine.

It is an object of this invention to widen didactic capabilities of the teaching machine in the automatic teaching process, to increase the efficiency of use of the study material from conventional textbooks and to make the teaching machine more economical.

SUMMARY OF THE INVENTION

The invention consists of a teaching machine for studying foreign and native languages comprising a task unit for programs of successive algorithmic exercises, including a program carrier, a memory for storing the codes of answers to the questions of the program, and a remote control panel intended to insure the semiautomatic mode of operation of the teaching machine; a decoder, for decoding the inner programs of the memory and indicating correct answers, coupled to the memory of the task unit; an answer input unit coupled to the control panel and insuring by means of switches input of answers to the questions of the program; and an answer analyzing unit having one input coupled to the answer input unit and another input connected to the remote control. The panel, outputs of the answer analysing unit are coupled, respectively, to a printout mechanism, the memory and one input of a signalling unit. The signalling unit indicates the correctness of the input answer and the operational mode of the teaching machine. The signalling unit has another input coupled to a control unit insuring, when a correct answer is given to the question of the exercise, transition to the next exercise. The inputs of the control unit are coupled to the answer analysing unit and to the memory of the task unit for setting the program of successive algorithmic exercises. The outputs of the control unit are coupled to a reference unit intended to insure, when incorrect answer is given, delivery of reference material to each item of the program of algorithmic exercises and to the answer input unit. According to the invention, the task unit is provided with a direct programmer intended to insure programming of algorithmic exercises from any conventional textbook on foreign and native languages and their subsequent use in the teaching machine. The programmer is made as a storage coupled to the control unit and to the decoder and interacting through the control unit with the memory of the task unit and with the answer input unit, when using algorithmic exercises having unambiguous solutions from conventional textbooks.

It is preferable, in order to insure prompt and precise preparation of the teaching machine operation in any mode, that the direct programmer be made detachable as a cassette provided with a plug connector and a set of coding pegs, each having a head with digital indication and contacts arranged on the contact axle of the peg in accordance with the digital indication.

In order to increase the reliability it is expedient that the direct programmer be provided with contact strips located on the bottom of the cassette and connected to the plug connector and contacting the coding pegs through these contacts.

In order to ensure reliable latching and to simplify insertion of the coding peg in a required position, it is preferable that the head of each coding peg be provided with springs and the top lid of the cassette be equipped with markings.

The use of the manually operable programmer in the teaching machine permits programming a random exercise from a conventional text-book for its subsequent employment in the teaching machine.

BRIEF DESCRIPTION OF THE DRAWINGS

These and other objects and advantages of the present invention will become more apparent from the following detailed description of preferred embodiments thereof, taken in conjunction with the accompanying drawings, wherein:

FIG. 3 is an electrical schematic diagram showing the connection of the manually operable programmer and the teaching machine, according to the invention.

DETAILED DESCRIPTION OF THE INVENTION

Figure 1:
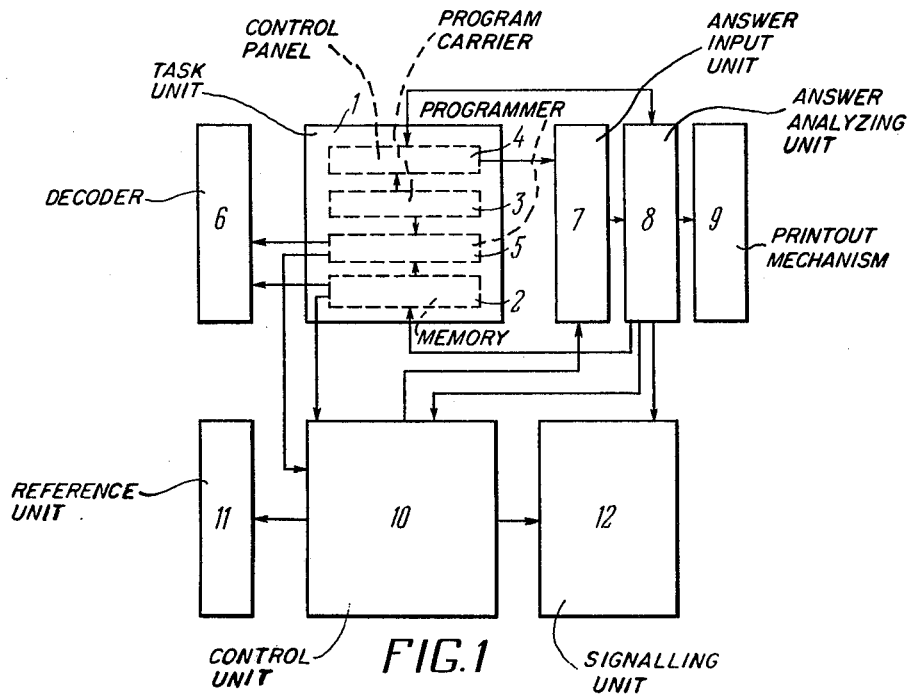
FIG. 1 is a block-diagram of a teaching machine for studying foreign and native languages, according to the invention.

A teaching machine for studying foreign and native languages has a task unit 1 (FIG. 1) of a program of successive algorithmic exercises comprising a memory 2 built around step-by-step selectors and groups of relays which serve to produce a constant code program, a program carrier 3 made as a sheet with algorithmic exercises plotted thereon or a text-book with exercises programmed with regard to code programs of the memory 2, and a remote control panel 4 insuring semiautomatic mode of operation of the machine when a teacher participates in the system. In this case the remote control panel is made as a console and is located on the teacher's table. Further, the task unit 1 comprises a manually operable programmer 5 intended to insure programming of algorithmic exercises from any conventional textbook on foreign and native languages.

The memory is coupled to a decoder 6 which ensures decoding of code programs of the memory 2. It can also serve to decode the storage of the manually operable programmer 5 which is also coupled to the decoder 6. This is required for preliminary testing of a new algorithmic exercise coded by the teacher before it is offered to the student. The remote control panel 4 is coupled to an answer input unit 7 to which an answer analyzing unit 8 is connected. The analyzing unit 8 is coupled to the memory 2, the remote control panel 4 and a printout mechanism 9 which, if necessary, prints or displays digitally the results of the students' work.

The control unit 10, whose inputs are connected to the analyzing unit 8, the manually operable programmer 5 and the memory 2 is built around relay groups and switches and prepares the teaching machine for operation, sets the mode of operation and insures, if the student gives a correct answer to the question of an exercise, transition to the next exercise. One output of the control unit 10 is coupled to a reference unit 11 which, when an incorrect answer is given, supplies the relevant information, if the student so wishes. The second output of the control unit 10 is connected to the answer input unit 7 and the third output is connected to a signalling unit 12 which counts the number of incorrect answers or displays the students' marks, when the teaching machine operates in the "examination" mode, indicates whether the answer is correct or not, when the teaching machine operates in the "training" mode, and also shows the mode in which the machine is operating.

Figure 2:
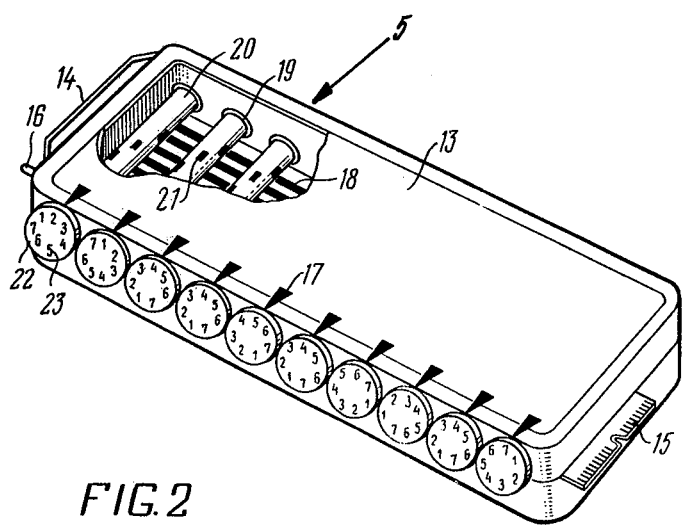
FIG. 2 is a general, perspective view of a manually operable programmer, according to the invention.

The manually operable programmer 5 (FIG. 2) is a storage made detachable as a cassette 13 equipped with a handle 14 and a plug connector 15 and having an indicator lamp 16 and marks 17. Seven contact strips 18 are located inside the cassette 13 on its bottom and ten code pegs 20 are arranged thereabove and secured on both ends in contact bushes 19. The number of code pegs 20 is equal to the number of questions in the programme offered to the students.

Each code peg 20 is provided with seven contacts 21 coupled in parallel to the contact axle of the code peg 20, which indicates the maximum selection capabilities in this case (one of the seven). The number of each of seven contacts 21 corresponds to the number of the keys of the answer input unit 7. A head 22 of the code peg 20 has indication digits 23 from one to seven, which can be placed against the mark 17 on the lid of the cassette 13 by rotating the head 22. When one of the indication digits 23 is set against the mark 17, the contact 21 of the code peg 20 is matched with one of the contact strips 18. In order to hold the contact 21 with the strip 18 more firmly, a spring (not shown) is placed between one of the contact bushes 19 and the head 22. All ten code pegs 20 are of the same shape and have uniform position of the contacts 21 and uniform fastenings.

The number of vertical and horizontal contacts 21, their assembly and the method of switching depend on the peculiarities of the memory 2 and the answer input unit 7. The number of the code pegs 20 is selected at random, they can be assembled in several cassetes and the code pegs can be faceted without changing the essense of the invention remains unchanged.

The contact bushes 19 of each code peg 20 are provided with individual outputs 24 (FIG. 3). Referring to FIG. 3, only the outputs of the contact bushes 19 (FIG. 2) of only two code pegs 20, the first and the last one, are shown. The outputs 24 (FIG. 3) of all the contact bushes 19 (FIG. 2) are coupled to the plug connector 15. The number of vertical rows correspond to the number of the code pegs 20, that is to the number of questions of the program offered to the students from a conventional umprogrammed text-book. The contact strips 18 located on the bottom of the cassette 13 are provided with outputs 25, 26, 27, 28, 30 and 31 (FIG. 3), each corresponding to one language element located on a code panel 32. The outputs 25–31 are connected to break contacts 33a of a relay 33 of the control unit 10. FIG. 3 shows positioning the contacts 21 of the first and tenth code pegs 20 (FIG. 2) in accordance with the setting of the indication digits 23 on the first and tenth heads 22, respectively, against the first and second marks 17.

Constructionally the circuit of the manually operable programmer 5 is made on a two-side printed plate placed on the bottom of the cassette 13 whereon the contact strips 18 are secured. One of the side parts of the printed plate serves at the same time as the insert of the plug connector 15.

Make contacts 33b (FIG. 3) of the relay 33 are connected to slide contacts 34, 35, 36, 37, 38, 39 and 40 of the step-by-step selector of the memory 2, each corresponding to one of the language elements on a code panel 41 of the answer input unit 7. Each of the first seven plates 42 of the step-by-step selector is provided with bars 43 which are used to produce a code program comprising code positions 44. A slide contact 45 of the eighth plate 42 of the step-by-step selector is connected to a switch 46 of the control unit 10. A switch 47 is connected to the relay 33, and a switch 48 is connected to the first bar 43 of the first plate 42 and the step-by-step selector of the memory 2. The outputs 24 of the contact bushes 19 (FIG. 2) are connected to bars 43 (FIG. 3) of the eighth plate 42. A break contact 49a of a relay 49 is connected to a reference key 50 of the control unit 10 and to the power source in order to keep the relay 49 self-blocked until a correct answer is obtained. The correct answer pulse switches the step-by-step selector of the memory 2 to a new position and at the same time removes self-blocking of the relay 49.

The answer input unit 7 has seven switching elements —keys 51, each provided with four contacts a, b, c and d (shown for two keys 51 as an example). Each key 51 corresponds to one of the language elements arranged on the code panel 41. The contact "a" of each key 51 is coupled to the respective slide contact 33c of the relay 33. The second contact "b" connected in series with respective contacts of each of the seven keys 51 is coupled to a relay 52 of the analyzing unit 8. The third contact "c" of each key 51 is coupled to the power source. Series-connected fourth contacts "d" are coupled to the make contact 52a of the relay 52 of the analyzing unit 8 which is coupled to the printout mechanism 9, the signalling unit 12, as well as to the relay 49 of the control unit 10 and the reference key 50. The break contact 52b of the relay 52 is connected to the power source, the print-out mechanism 9, the signalling unit 12 and the memory 2.

The teaching machine operates as follows.

The teacher uses a special text-book containing algorithmic exercises of any language programmed with regard to code programs of the memory 2 and determines which of the exercises is to be done by the student. For example, an exercise to train correct usage of English prepositions comprising for clarity 10 successive tasks having unambiguous solutions.

1. Take yourself . . . hand.
2. I took him . . . dinner once.
3. She died . . . a heart attack after a long illness.
4. I was successful . . . my opinion.
5. I'm not . . . the least blind to your advice.
6. I did it entirely . . . my own.
7. The party was . . . its height.
8. I disapproved . . . what I saw.
9. He was a big man, bigger than John . . . a head.
10. She was silent . . . a bit.

This exercise is programmed with regard to the code positions 44 of the memory 2 as shown in FIG. 3. Correct answers, as language elements, which are prepositions "in", "to", "by", "for", "of", "on", "at" are put on the code panel 41. For the first task the correct answer is the preposition "in", for the second task — "to", for the third one — "of" and further on "in", "in", "on" and "at", "by", "for". The arrangement of code positions 44 on the plates 42 demonstrates that the correct answer for each task coincides with the respective code position 44. Consequently, to do the first task of the exercise it is necessary to press the first key 51 of the answer input unit 7. The language element "in" is written on the code panel 41 over that key 51 which corresponds to the correct answer: "Take yourself in hand". If the answer is correct, the contacts "a" and "b" of the respective key 51 come together and a pulse corresponding to the correct answer passes from the slide contact 34 of the first plate 42 via the contacts 33b and 33c and contacts "a" and "b" of the key 51 to the relay 52. In this case the contact 52 closes and the indicator lamp of the signalling unit 12 is energized to demonstrate the correctness of the student answer. At the same time the step-by-step selector of the memory 2 is energized and moves to the code position 44 prepared for the second answer.

If the answer is correct, for example if the seventh key 51 is pressed (as shown in FIG. 3) which corresponds to incorrect use of the preposition "at", the contacts "c" and "d" of the respective key 51 are closed. In this case the pulse corresponding to the incorrect answer passes through the contact 52 and is further supplied to the indicator lamp of the signalling unit 12, which indicates that the answer was incorrect. The relay 49 operates closing the contact 49a. The sign "incorrect" on the display of the signalling unit 12 goes out only after the student gives a correct answer. When the correct answer is put in, the relay 49 is disconnected and the contact 49a breaks. If the student wishes, a reference to the correct solution of the task can be obtained. To do this the reference key 50 should be pressed. As a result the correct language element is illuminated on the chart of the program carrier 3 or on the display of the reference unit 11. This is the way the teaching machine operates, when the teaching material programmed with regard to the code positions 44 is used. FIG. 3 is a diagram of one of the many code programs featuring ten code positions 44.

The teaching machine operates in the following way when use is made of any conventional textbook. The teacher chooses some algorithmic exercise which he feels is necessary at this moment from some conventional text-book. The programming is done by means of the manually operable programmer 5.

Referring to FIG. 3, the text of such an exercise also comprises ten tasks. Language elements are prepositions. All tasks are arranged at random and do not coincide with any of the many code programs of the memory 2. In order to make use of such tasks the teacher sets one of the indicator digits 23 (FIG. 2) of each head 22 of the code peg 20 against the mark 17, having in advance arranged at random all language elements of this exercise on the code panel 32 as shown in FIG. 3. For the first task the correct preposition is "in", for the second task — "to" and further on "for", "for", "in", "for", "by", "of", "for" and "at". In this case the digits 23 (FIG. 2) are set against the marks 17 in the following order: "two", "one", "four", "four", "five", "four", "six", "three", "four", "seven".

After the digits 23 of all ten code pegs 20 are set in the required position against the ten marks 17, the cassette 13 of the direct programmer 5 is fit into the body of the teaching machine. If the direct programmer 5 is fit properly, the lamp 16 is illuminated and the lid of the teaching machine is locked. After that the direct programmer 5 is coupled to the control unit 10 by means of the switch 47. Voltage is supplied through the switch 46 from the power source to the eighth slide contact 45 and to the bars 43 of the eighth plate, which are coupled to the outputs 24 of the contact bushes 19 (FIG. 2), and, thus, voltage is supplied to the contacts 21 of the code pegs 20 and to the respective contact strip 18.

The preposition "in" is the correct answer to the first task, all other prepositions are incorrect. Consequently, the second contact 21 of the first code peg 20 is closed, which corresponds to the indication digit "two" on its head 22. The pulse corresponding to the correct answer passes through the second contact 21 (FIG. 3), the contacts 33a and 33c and contacts "a" and "b" of the second key 51 and is fed to the relay 52. As a consequence, the contact 52b closes. The indication lamp of the signalling unit 12 is energized, indicating the correct answer and, simultaneously, the step-by-step selector of the memory 2 is energized so that it is shifted to the next contact 21.

If the answer is incorrect, for example, when the preposition "for" is used in the first task, that is when the fourth key 51 is pressed, the contacts "c" and "d" are closed, the relay 52 operates, the contact 52a closes and the indication lamp of the signalling unit 12 illuminates indicating the incorrect answer. If necessary, the student can obtain reference material by using the reference key 50.

The cycle of pulses corresponding to correct and incorrect answers is identical both when the direct programmer 5 is used with the inherent system of coding of the study material and without the system by using the stable memory 2.

The text gives examples in English, but is quite evident that the proposed teaching machine can be used for teaching any foreign or native language.

The electric circuit of the direct programmer 5 permits disconnection of the memory 2 (FIG. 1) from the circuit of the teaching machine and ensures programming of any algorithmic exercise from any conventional textbook by new technical data. Code programs are prepared by means of the manually operable programmer 5 manually. In this way the great number of working hours of teacher-programmers used on preparation of teaching programs for the machine is reduced. Also, material resources are conserved as there will no longer be duplication of such programs. It becomes possible to program algorithmic exercises from any conventional text-book in any foreign or native language. The didactic capabilities of the teaching machine are significantly expanded and it becomes more effective and more profitable economically.

What is claimed is:

1. A teaching machine for studying foreign and native languages, comprising:
    (a) a task unit of (the program) a program of successive algorithmic exercises;
    (b) a program carrier of said task unit;
    (c) a memory of said task unit, for storing codes of answers to the questions of the program of algorithmic exercises, having an input and first and second outputs;
    (d) a remote control panel of said task unit for semiautomatic operation of the teaching machine coupled to said program carrier and having an output;
    (e) a manually operable programmer of said task unit, made as a memory for programming algorithmic exercises from any conventional textbook, coupled to said memory and to said program carrier and having first and second outputs;
    (f) a decoder, for decoding the inner programs of said memory and indicating a correct answer, coupled to said first output of said memory and to said first output of said programmer;
    (g) an answer input unit having switching elements, which insure the input of answers to the questions of the program of algorithmic exercises, first and second inputs and an output, said first input being coupled to said output of said remote control panel;
    (h) an answer analyzing unit having an input and first, second, third and fourth outputs, and being coupled to said remote control panel, said input being coupled to said output of said answer input unit, said first output being coupled to said input of said memory;
    (i) a printout mechanism producing printed results of the student work and connected to said second output of said answer analyzing unit;
    (j) a reference unit insuring, when an incorrect answer is given, delivery of the reference material to each item of the program of algorithmic exercises;
    (k) a signalling unit indicating the correctness of the answer and the mode of operation of the teaching machine, having a first input coupled to said third output of said answer analyzing unit and a second input; and
    (l) a control unit insuring, when a correct answer is given, transition to the task of the next exercise, having first, second and third inputs and first, second and third outputs, said first output being coupled to said reference unit, said second output being coupled to said second input of said signalling unit, said third output being coupled to said second input of said answer input unit, said first input being coupled to said fourth output of said answer analyzing unit, said second input being connected to said second output of said memory and said third input being connected to said second output of said manually operable programmer, in order to insure interaction of said manually operable programmer to said memory and said answer input unit, when algorithmic exercises having unambiguous solutions from conventional textbooks are used.

2. A teaching machine as claimed in claim 1, wherein said manually operable programmer is made detachable as a cassette equipped with a plug connector and a set of code pegs, each code peg having a head with digital indication and contacts located on the contact axle of said code peg in accordance with said digital indication.

3. A teaching machine as claimed in claim 2, wherein said manually operable programmer is provided with contact strips located on the bottom of said cassette, connected to said plug connector and contacting said code pegs through said contacts.

4. A teaching machine as claimed in claim 2, wherein said head of each of said code pegs is provided with springs and the top lid of said cassette includes marks.

5. A teaching machine as claimed in claim 3, wherein said head of said code pegs is provided with springs and the top lid of said cassette includes marks.

* * * * *